UNITED STATES PATENT OFFICE.

JAMES H. GARRETT, OF TERRE HAUTE, INDIANA.

EDGE-BLACKING POWDER FOR LEATHER.

SPECIFICATION forming part of Letters Patent No. 258,404, dated May 23, 1882.

Application filed February 7, 1882. (No specimens.)

*To all whom it may concern:*

Be it known that I, JAMES H. GARRETT, a citizen of the United States, and a resident of Terre Haute, in the county of Vigo and State of Indiana, have invented a new and valuable Improvement in Edge-Blacking Powder for Leather; and I do hereby declare that the following is a full, clear, and exact description of the same.

This invention has relation to edge-blacking for the use of leather-workers; and it consists in the composition of the ingredients hereinafter named, in the proportions referred to, forming a fine powder, as hereinafter set forth.

The object of this invention is to provide for the trade an economical edge-blacking of brilliant character. In accomplishing this result I have used articles which have been employed heretofore in making blackings for leather.

My improvement is found in the resultant powder compounded of the following ingredients, in the proportions stated, to wit: five ounces of the extract of logwood; two ounces of bichromate of potash; one-half ounce of prussiate of potash; one ounce of copperas; one ounce of blue vitriol. These ingredients are compounded in the following manner: I compound these articles by grinding each article separately to a fine powder, and then placing the proper proportion of each into a glass jar, tightly covered, shake it until the ingredients are thoroughly mixed and commingled. I then put the compound up in packages or boxes, and label for the trade. In this way I produce from the ingredients a full half-pound of fine powder, which is designed to be sold to the trade in this form. It can be dissolved as needed for use. The half-pound of powder compounded as above set forth will make, when dissolved in water, three gallons of edge-blacking. The color produced is a brilliant and durable black, forming a splendid finish for the work of shoe-makers and harness-makers.

Having described this invention, what I claim, and desire to secure by Letters Patent, is—

The edge-blacking powder for leather, consisting of the extract of logwood, bichromate of potash, prussiate of potash, and copperas, and blue vitriol, compounded in the proportions specified.

In testimony that I claim the above I have hereunto subscribed my name in the presence of two witnesses.

JAMES HENRY GARRETT.

Witnesses:
W. H. ROBBINS,
R. J. FLAGG.